United States Patent [19]

Hirose et al.

[11] Patent Number: 5,229,873
[45] Date of Patent: Jul. 20, 1993

[54] LIQUID CRYSTAL DISPLAY HAVING APERTURES IN BOTH ELECTRODES

[75] Inventors: Shinichi Hirose, Isehara; Jean F. Clerc, Machida, both of Japan

[73] Assignee: Stanley Electric Co., Ltd., Tokyo, Japan

[21] Appl. No.: 783,929

[22] Filed: Oct. 29, 1991

[30] Foreign Application Priority Data

Nov. 2, 1990 [JP] Japan ................................. 2-298057

[51] Int. Cl.$^5$ ........................................ G02F 1/1343
[52] U.S. Cl. ........................................ 359/55; 359/87
[58] Field of Search ........................ 359/55, 74, 76, 78, 359/87

[56] References Cited

U.S. PATENT DOCUMENTS

| | | | |
|---|---|---|---|
| 3,694,053 | 9/1972 | Kahn | 350/150 |
| 3,941,454 | 3/1976 | Maezawa | 359/89 |
| 4,023,890 | 5/1977 | Shirasu et al. | 359/87 X |
| 4,140,371 | 2/1979 | Kanazaki et al. | 359/87 |
| 4,741,600 | 5/1988 | Pirs et al. | 359/87 |
| 4,759,609 | 7/1988 | Clerc | 359/55 |
| 4,775,224 | 10/1988 | Germain et al. | 359/87 X |
| 5,002,367 | 3/1991 | Nicholas | 359/54 |
| 5,007,716 | 4/1991 | Hanyu et al. | 359/75 X |
| 5,056,895 | 10/1991 | Kahn | 359/87 |
| 5,066,110 | 11/1991 | Mizushima et al. | 359/76 X |
| 5,136,407 | 8/1992 | Clerc | 359/55 |

FOREIGN PATENT DOCUMENTS

| | | |
|---|---|---|
| 2705399 | 8/1977 | Fed. Rep. of Germany . |
| 58-050514 | 3/1983 | Japan . |
| 60-046225 | 3/1985 | Japan . |
| 1531730 | 11/1978 | United Kingdom . |

OTHER PUBLICATIONS

"Electro-Optical Limits of the Electrically Controlled Birefringence Effect in Nematic Liquid Crystals" F. Clerc, Displays, vol. 2, No. 7, Oct. 1981, pp. 341–347.
"Homeotropic-Alignment Full-Color LCD" S. Yamauchi et al., SID International Symposium, Digest of Technical Papers, vol. 20, 1989, pp. 378–381.
Patent Abstracts of Japan, vol. 12, No. 194 (P-713) (3041) 7 Jun. 1988 and JP-A-62 299 944 (Sharp) 26 Dec. 1987.

*Primary Examiner*—William L. Sikes
*Assistant Examiner*—Ron Trice
*Attorney, Agent, or Firm*—Nixon & Vanderhye

[57] ABSTRACT

Disclosed is a liquid crystal display comprising a liquid crystal layer, a pair of substrates holding the liquid crystal layer therebetween and having two sets of crossed electrodes formed thereon, a pair of crossed polarizers provided outside the substrates and having polarization axes parallel to the electrodes respectively, and an orientation means for making the liquid crystal molecules orient to the intermediate direction of the crossed polarizers at the commencement of voltage application. The orientation means is selected form pretilt, fringe electric field, combinations thereof, etc. In the beginning of voltage application, no leakage light is generated even if the liquid crystal molecules are tilted by a fringe electric field in the vicinity of the edges of the electrodes.

8 Claims, 5 Drawing Sheets

LIQUID CRYSTAL DISPLAY HAVING APERTURES IN BOTH ELECTRODES

BACKGROUND OF THE INVENTION

1. Field of the Invention

The present invention relates to a liquid crystal display, and particularly relates to a liquid crystal display in which the birefringence function of liquid crystal molecules is controlled by a voltage.

2. Description of the Related Art

FIGS. 2A and 2B show an example of a homeotropic liquid crystal display according to a conventional technique.

FIG. 2A shows a schematic configuration of a cell of the hometropic liquid crystal display. Two sets of transparent electrodes 22 and 24 are formed on the opposite surfaces of a pair of glass substrates 21 and 25, respectively. The sets of electrodes 22 and 24 are elongated in the y and x directions respectively. Liquid crystal molecules 23 are sandwiched between the pair of glass substrates 21 and 25 so as to constitute a liquid crystal cell 20. When no electric field is applied to the liquid crystal molecules 23, the liquid crystal molecules 23 show a homeotropic orientation substantially perpendicular to the respective surfaces of the substrates 21 and 25. Each liquid crystal molecule 23 has an elongated shape, and has a high refractive index in its axial direction. In addition, each liquid crystal molecule 23 has an electric dipole in a direction perpendicular to its axial direction. Upon application of a voltage across the two sets of electrodes 22 and 24, each liquid crystal molecule 23 is tilted toward the direction parallel to the respective surfaces of the substrates 21 and 25 by the action of an electric field. In order to control the direction of this tilt, the respective surfaces of the substrates 21 and 25 and the electrodes 22 and 24 are subjected to orientation treatment in advance. The orientation treatment is performed so as to orientate liquid crystal molecules along the y direction. Therefore, when no electric field is applied, each liquid crystal molecule has a pretilt which is directed to the y direction slightly. When an electric field is applied, the liquid crystal molecule tilts so as to fall along the y direction.

A pair of crossed polarizers 10 and 30 are disposed outside the substrates 21 and 25 respectively. Polarization axes P1 and P2 of these polarizers 10 and 30 are disposed at an angle of 45° relative to the x and y axes respectively as shown in FIG. 2B.

If the liquid crystal molecules are aligned along the y direction by the action of an electric field, light transmitted through the polarizer 10 is depolarized by the liquid crystal layer by the birefringence of the liquid crystal molecules so that the light can transmit through the other polarizer 30.

When the liquid crystal molecules are in homeotropical orientation, the birefringence of the liquid crystal molecules have no effect on the transmitted light, so that the light transmitted through the one polarizer reaches to the other polarizer as it is while keeping its polarization state, and the light is cut off by the action of the crossed polarizer to show a dark state.

As to the details of such a homeotropic liquid crystal display, for example, reference is made to "Homeotropic-Alignment Full-Color LCD", SID, '89.

SUMMARY OF THE INVENTION

It is therefore an object of the present invention to provide a liquid crystal display in which contrast is prevented from being lowered in the beginning of application of a voltage.

According to one aspect of the present invention, there is provided a liquid crystal display comprising: a pair of substrates disposed in opposition to each other; two sets of electrodes provided on the pair of substrates respectively so as to cross substantially perpendicularly to each other; a pair of crossed polarizers having respective polarization axes disposed in the same directions as the two sets of electrodes; and a liquid crystal molecule orientation means for tilting liquid crystal molecules to the intermediate direction of the polarization axes of the crossed polarizers in a main area between the opposite electrodes when a voltage is applied across the two sets of electrodes.

The polarization axes of the crossed polarizers are disposed in the same direction as the electrodes. Therefore, in the beginning of application of a voltage, no depolarization is generated in the vicinity of the edges of the electrodes even if the liquid crystal molecules are oriented to the direction perpendicular to the edges of the electrodes by a fringe electric field. It is therefore possible to prevent the contrast from being lowered in the beginning of application of a voltage.

In the ON state, most of the liquid crystal molecules are oriented to the intermediate direction of the polarization axes of the crossed polarizers, so that the light transmitted through the one polarizer is depolarized by the liquid crystal molecules, and the light can transmit through the other polarizer.

As has been described, it is possible to provide a liquid crystal display in which light leakage is less even in the beginning of voltage application across the electrodes.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Before the description of the embodiments of invention, the prior work of one of the present inventors will first be described for enhancing the understanding of this invention.

PRIOR WORK

Figure 3:
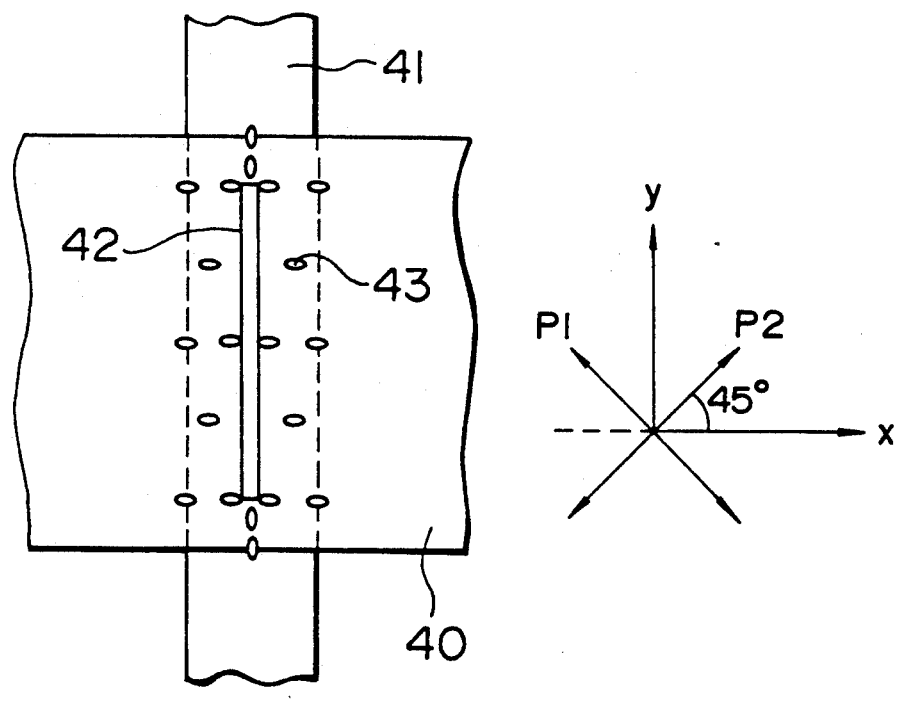
FIG. 3 is a schematic view for explaining a liquid crystal display of the prior work by one of the present inventors.

FIG. 3 shows a schematic configuration of a homeotropic liquid crystal display which is a prior work by one of the inventors of this application.

Figure 2A:
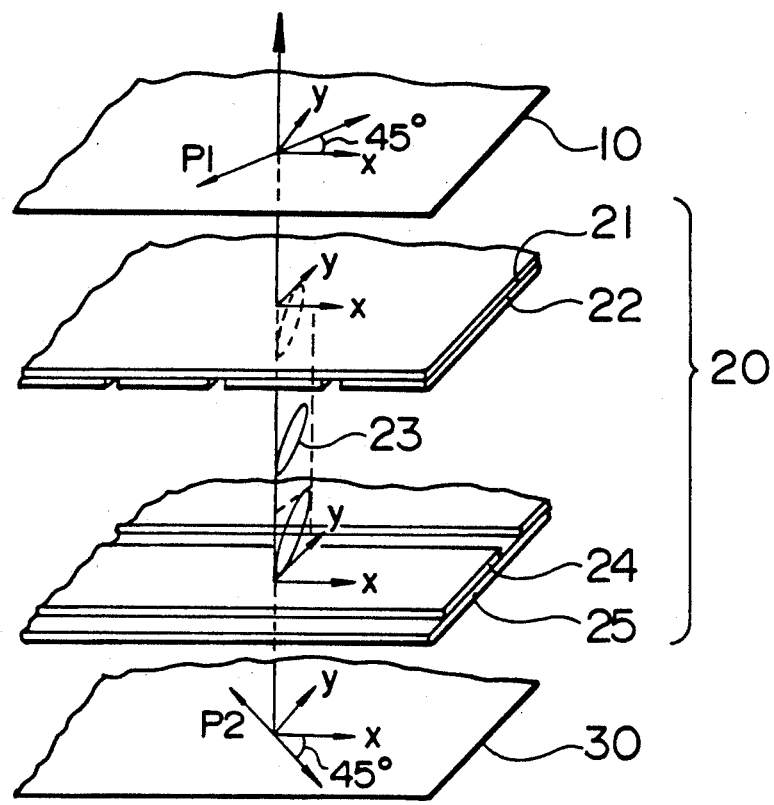
FIGS. 2A and 2B are diagrams for explaining a conventional liquid crystal display, FIG. 2A being a perspective view illustrating a configuration of a liquid crystal cell, FIG. 2B being a graph illustrating the disposition of the polarization axes and an orientation direction.
Figure 2B:
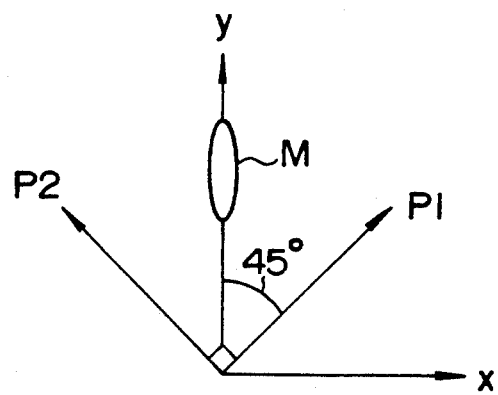

Homeotropic liquid crystals are held between a pair of substrates on which crossed electrodes 40 and 41 are formed respectively. One electrode 40 of these crossed electrodes has an elongated slit 42 which is parallel to the edges of the other electrode. In addition, a pair of crossed polarizers are provided on the opposite sides of the liquid crystal cell. The polarization axes P1 and P2 of these polarizers are disposed at an angle of 45° relative to the x and y directions which are directions of the electrodes 40 and 41 respectively, in the same manner as in the liquid crystal display shown in FIGS. 2A and 2B.

In such a configuration as shown in FIG. 3, in the beginning of application of a voltage across the electrodes 40 and 41, an electric field is formed between the electrodes 40 and 41 while mainly tilting toward the x direction because of the existence of the slit 42. Therefore, liquid crystal molecules 43 tilt substantially to the x direction. In such a manner, it is possible to obtain a uniform display in a large area.

As to the details of this liquid crystal display, the disclosure of Japanese Patent Application No. Hei-2-57783 (U.S. Patent Application Ser. No. 07/664,035, now U.S. Pat. No. 5,136,407 European Patent Application No. 91103419.7) is incorporated herein by reference. In each of the liquid crystal displays shown in FIGS. 2 and 3, the respective polarization axes P1 and P2 of the crossed polarizers are disposed at an angle of 45° relative to the longitudinal directions of the electrodes. When no voltage is applied across the electrodes, the liquid molecules are in the homeotropic disposition substantially perpendicular to the substrates, so that light transmitted though one of the polarizers reaches the other polarizer without being influenced by the liquid crystal layer, and is cut off at the other polarizer. When a voltage is applied between the electrodes, the light transmitted through the one polarizer is depolarized by the liquid crystal layer so that the light can transmit through the other polarizer.

In the beginning of application of a voltage, however, a fringe electric field is produced in edge portions of the electrodes. This fringe electric field has a component in the direction perpendicular to the edges of the electrodes. Therefore, in comparison with a center portion of the electrodes, the liquid crystal molecules receive a larger force in an area near the edges of the electrodes, so that the liquid crystal molecules fall to the direction perpendicular to the edges of the electrodes. If the liquid crystal molecules are oriented in the direction perpendicular to the edges of the electrodes, the light transmitted through the one polarizer is depolarized in the liquid crystal molecules so that the light can transmit through the other polarizer. This phenomenon is produced preferentially in the edge portions of electrodes. That is, the liquid crystal molecules start tilting at a lower voltage in a peripheral portion of a pixel than in a center portion thereof so that the contrast becomes lower.

In addition, in the configuration in FIG. 2, the light is transmitted effectively when the liquid crystal molecules tilt to the y direction uniformly in the beginning of application of a voltage. It is therefore effective to give the liquid crystal molecules pretilt in the initial orientation. In that case, the voltage-to-transmission characteristics become not sharp.

Figure 1A:
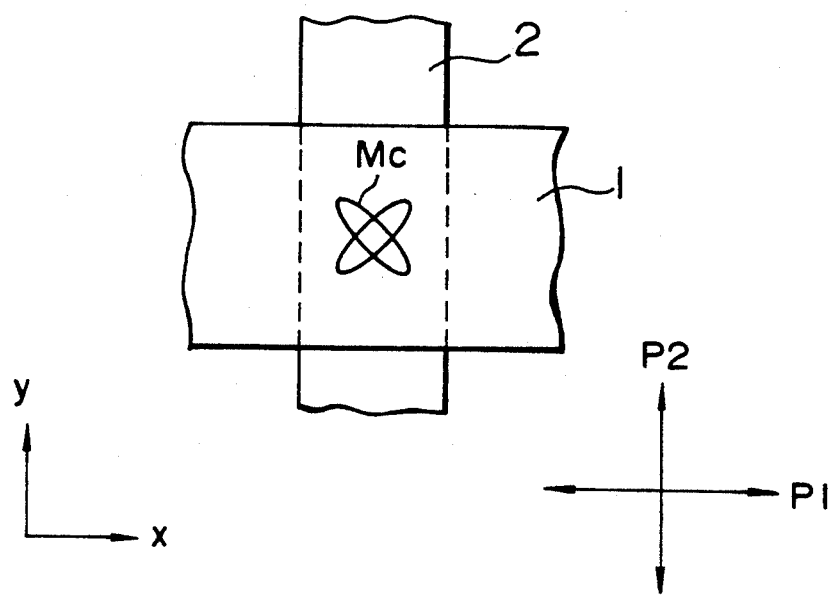
FIGS. 1A and 1B are diagrams for explaining a basic concept of the present invention, FIG. 1A being a schematic view illustrating a configuration thereof, FIG. 1B being a schematic plan view for explaining the tilt of a liquid crystal molecule at the beginning of voltage application.
Figure 1B:
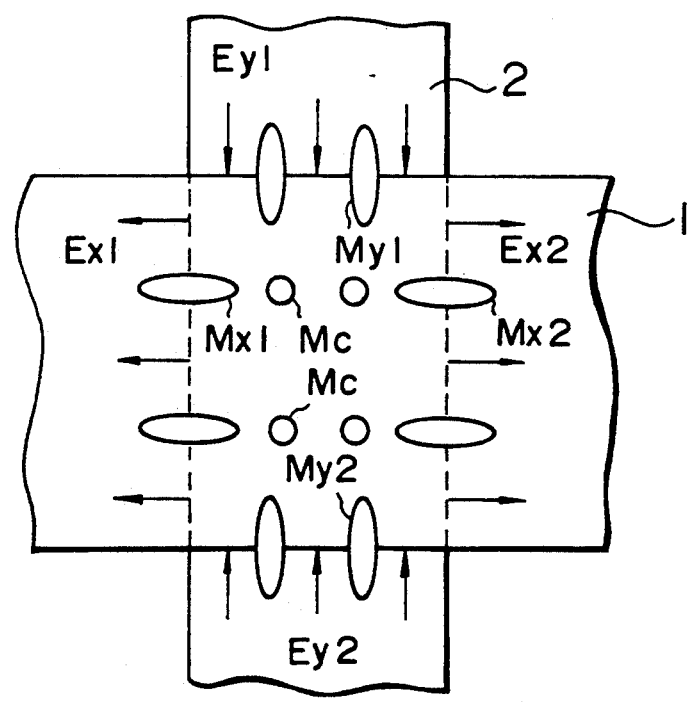

Referring to FIGS. 1A and 1B, a basic concept of the present invention will now be described.

FIG. 1A shows a basic structure of a liquid crystal display cell schematically.

Electrodes 1 and 2 provided on a pair of substrates are disposed so as to extend in the x and y directions perpendicular to each other, respectively. A pair of polarizers are provided outside these substrates so that the polarizers have orthogonally intersecting polarization axes P1 and P2. These polarization axes P1 and P2 of the crossed polarizers are disposed along the x and y directions respectively. The substrates are subjected to orientation treatment in advance so that liquid crystal molecules are oriented to the intermediate direction of the polarization axes upon application of a voltage.

FIG. 1B is a diagram for explaining the tilt of the liquid crystal molecules at the beginning of application of a voltage.

When no voltage is applied, the liquid crystal molecules are oriented homeotropically so that they are disposed perpendicularly to the electrode surfaces as shown typically by liquid crystal molecules Mc in the center of FIG. 1B, giving no influence onto the light transmitted through the polarizer. When the voltage application across the electrodes 1 and 2 begins, fringe electric fields Ex and Ey are produced in the edge portions of the electrodes 1 and 2. Because of these electric fields Ex and Ey, the liquid crystal molecules existing in the edge portions of the electrodes 1 and 2 are, as shown typically by liquid crystal molecules Mx and My, oriented so as to fall to the directions perpendicular to the edges of the electrodes 1 and 2 respectively. The liquid crystal molecules oriented thus have a function to give an influence to the incident light. The the polarized incident light keeps its polarization direction or is cut off because the directions of the liquid crystal molecules are disposed parallelly or perpendicularly to the polarization axes P1 and P2. The light polarized by one polarizer and transmitted through the liquid crystal layer while keeping the polarization direction is cut off by the other polarizer. Even if the liquid crystal molecules begin to be oriented in the electrode edge portions, therefore, the transmission of light is not produced in those portions, so that the OFF state is kept on the display. Thereafter, the liquid crystal molecules Mc in the electrode center portion are oriented to the direction tilted to the polarization axes P1 and P2 as shown in FIG. 1A. The light transmitted through the one polarizer is influenced by the liquid crystal molecules so as to have a component in the direction of the other polarization axis, so that the transmitted light is produced and the ON state is produced on the display.

Figure 4:
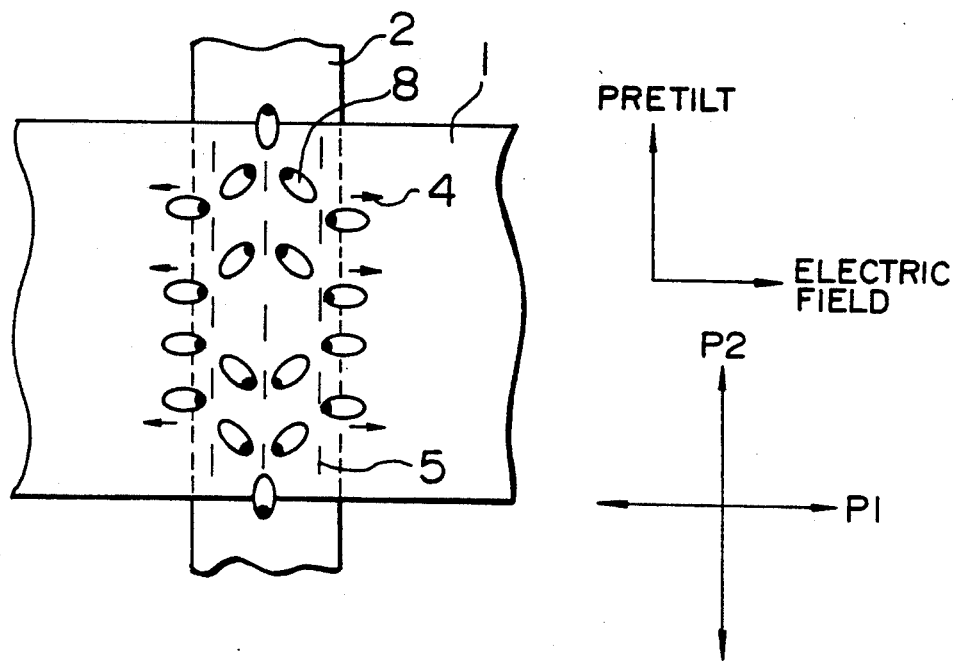
FIG. 4 is a schematic view for explaining a liquid crystal display according to a more specific embodiment of the present invention.

FIG. 4 schematically shows a cell of a liquid crystal display according to a more specific embodiment of the present invention.

Electrodes 1 and 2 provided on a pair of substrates are disposed so as to orthogonally intersect each other. A pair of polarizers sandwiching a liquid crystal cell therebetween are so disposed that their polarization axes P1 and P2 are parallel to the extending directions of the electrodes 1 and 2. The surfaces of the electrodes 1 and 2 and the substrates are subjected to orientation treatment in advance so that the liquid crystal molecules have a pretilt angle slightly tilting from the vertical or up/down direction in FIG. 4. In FIG. 4, the direction of the pretilt is illustrated with the vertical broken lines 5. In the edges of the electrode 2, an electric field 4 perpendicular to the edges is produced by a fringe electric field. That is, in a main portion of the electrode 2, the direction of the electric field 4 and the direction of the pretilt 5 are combined in the beginning of voltage application so that substantially intermediate orientation 8 between the two polarization axes P1 and P2 is produced.

In the beginning of voltage application, even if the liquid crystal molecules in the edge portions of the electrode 2 are oriented to the direction of the electric field 4, these liquid crystal molecules give no influence onto the polarization of light along the polarization axis P1, but have a cut-off influence only onto the polarization of light along the polarization axis P2. There is therefore no possibility that leakage light is produced by the orientation of the liquid crystal molecules in the beginning of voltage application, so that it is possible to provide a high-contrast display.

In the embodiment shown in FIG. 4, the combination effect of an electric field and pretilt is used to dispose the liquid crystal molecules in the intermediate direction of polarization axes. By using other effects in combination, it is possible to obtain the same or similar effect.

Figure 5:
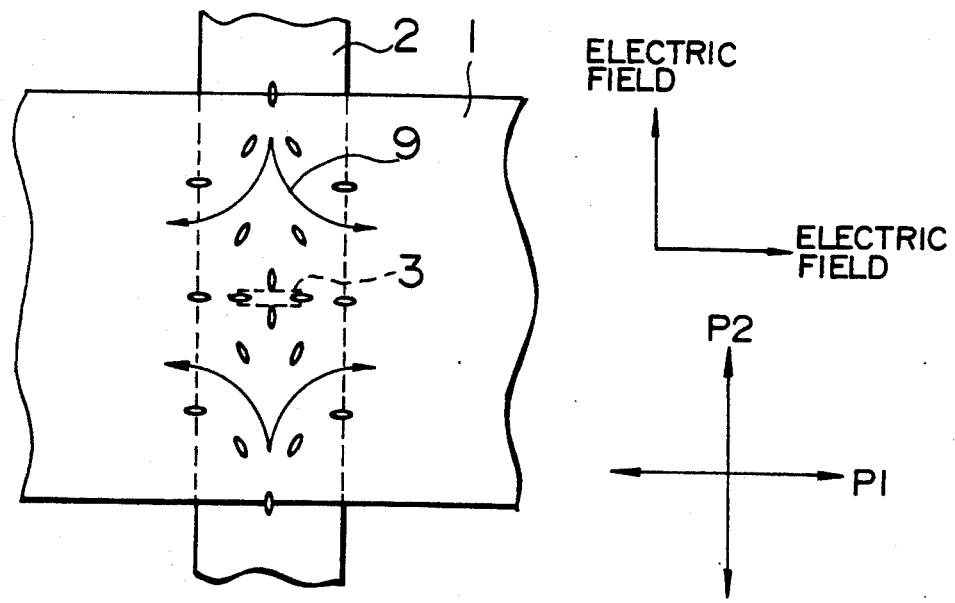
FIG. 5 is a schematic view for explaining a liquid crystal display according to another embodiment of the present invention.

FIG. 5 shows a liquid crystal cell of a liquid crystal display according to another embodiment of the present invention.

Electrodes 1 and 2 are disposed so as to orthogonally intersect each other, and crossed polarizers are provided outside the electrodes 1 and 2 so as to have polarization axes P1 and P2 parallel to the electrodes 1 and 2 respectively. An opening 3 elongated in the direction parallel to the edges of the electrode 1 is formed in the electrode 2. As has been described above, in the edge portions of the electrode, an electric field is produced in the direction perpendicular to the edges of the electrode. This electric field is in the vertical or up/down direction in FIG. 5 in the edge portions of the electrode 1, and in the horizontal direction in FIG. 5 in the edge portions of the electrode 2. In addition, at the longer sides of the opening 3 formed in the electrode 2, the electric field is in the vertical or up/down direction in FIG. 5. Therefore, the composite electric field is in the vertical direction in FIG. 5 in the horizontal center of the intersection portion of the electrodes 1 and 2, and is in the horizontal direction in FIG. 5 at the both horizontal side portion of the crossing area. That is, the composite electric field is in the intermediate direction of those directions, that is, an intermediate direction 9 of the two polarization axes P1 and P2 in the intermediate portions between the two sets of electrodes. Therefore, the liquid crystal molecules are oriented according to these directions of the composite electric field by the voltage application.

In the beginning of voltage application, in the edge portions of the electrodes (including edges of the opening 3), the liquid crystal molecules are oriented to the directions perpendicular to the edges, and those directions are parallel or perpendicular to the polarization axes of polarizers, so that there is no possibility of production of leakage light which deteriorates the contrast.

In the embodiment of FIG. 5, although the opening 3 is formed in one electrode 2, the opening is not limited to this.

Figure 6:
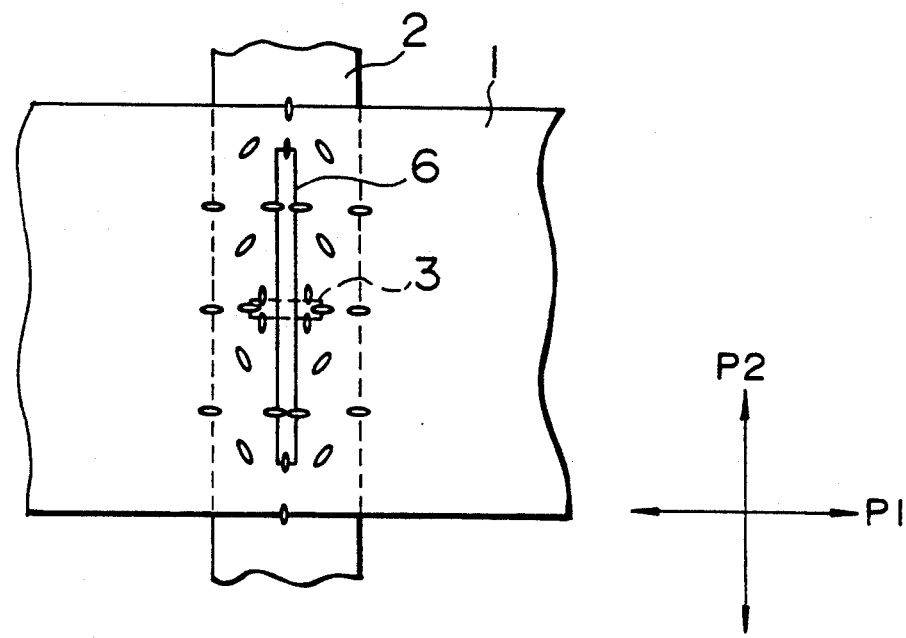
FIG. 6 is a schematic view for explaining a liquid crystal display according to a further embodiment of the present invention.

FIG. 6 schematically shows a liquid crystal cell of a liquid crystal display according to a further embodiment of the present invention.

In this embodiment, in addition to the structure shown in FIG. 5, a further opening 6 is formed also in the electrode 1 so as to extend in the direction perpendicular to the edges of the electrode 1. Also at the edges of this opening 6, electric fields are in the directions perpendicular to the edges. In the intersecting portion of the electrodes 1 and 2, therefore, the liquid crystal molecules are oriented to the intermediate direction of the polarization axes of the two polarizers by the combination of the electric fields. Therefore, at the time of application of a voltage, the liquid crystal molecules in most of the intersecting portion of the electrodes are oriented to the intermediate direction of the polarization axes, so that the ON state is attained. In addition, in the beginning of voltage application, the liquid crystal molecules are oriented to the directions perpendicular to the edges. Since these directions are parallel or perpendicular to the polarization axes of the polarizers, there is no possibility that leakage light is produced.

In this manner, it is possible to provide a high-contrast display.

Figure 7:
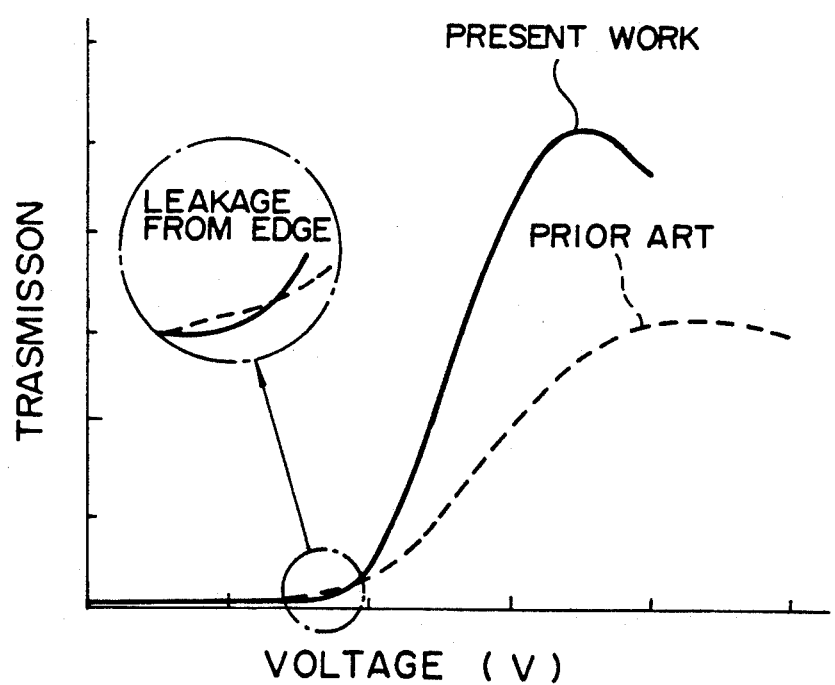
FIG. 7 is a graph comparatively illustrating the performance of an example of the structure according to the embodiment of the present invention and that in the conventional art.

FIG. 7 is a graph comparatively illustrating the transmission characteristics between those in the configuration of the embodiment of the present invention and in the configuration according to the conventional art.

In FIG. 7, the abscissa represents the voltage applied between the electrodes, and the ordinate represents the transmission of the light transmitted through a liquid crystal cell. In the beginning of voltage application, the transmission is increased because of leakage light from the edges in the case of the conventional art, while the transmission is suppressed to be low so that it is possible to provided a high-contrast display in the case of the embodiment of the present invention.

Although the present invention has been described in the light of its embodiments, the present invention is not limited to those embodiments. For example, the orientation structure to give pretilt, the arrangement of electrodes provided on a pair of substrates, the shape of openings provided in electrodes, etc. may be selected desiredly according to the purposes. It will be obvious for those skilled in the art to make various modifications, improvements, combinations, etc. of the above embodiments.

What is claimed is:

1. A liquid crystal display comprising:
a pair of substrates disposed to face each other;
two sets of electrodes provided on said pair of substrates respectively so as to substantially orthogonally intersect each other;
a pair of crossed polarizers having respectively polarization axes which are disposed in the same directions as the directions of extension of said two sets of substantially orthogonal electrodes;
liquid crystal molecules sandwiched between said two sets of electrodes;

a liquid crystal molecule orientation means for tilting said liquid crystal molecules to an intermediate direction of said polarization axes of said crossed polarizers in a main area of the intersect between said electrodes facing each other, said orientation means including an opening so formed in each electrode of both of said two sets of electrodes that said opening is elongated in the direction perpendicular to edges of said each electrode.

2. A liquid crystal display according to claim 1, wherein said liquid crystal molecule orientation means is constituted by an orientation structure for making said liquid crystal molecules pretilt on the surfaces of said electrodes and said two sets of electrodes which have such dimensions that the combination of a fringe electric field between said two sets of electrodes and an influence of the pretilt makes said liquid crystal molecules tilt toward said intermediate direction in a main area of the intersect between said electrodes when voltage application between said electrodes begins.

3. A liquid crystal display according to claim 2, wherein one of said two sets of electrodes is composed of thin electrodes and the other set is composed of electrodes thicker than said thin electrodes, and wherein said pretilt is given along said thin electrodes.

4. A liquid crystal display according to claim 1 wherein said liquid crystal molecules are homeotropically oriented in the absence of an applied voltage across said electrodes.

5. A liquid crystal display according to claim 1 wherein said electrodes are transparent.

6. A liquid crystal display according to claim 1 wherein said two sets of electrodes have different widths.

7. A liquid crystal display according to claim 1 wherein said liquid crystal molecules are homeotropically oriented in the absence of an applied voltage across the electrodes, said electrodes being transparent.

8. A liquid crystal display according to claim 7 wherein said two sets of electrodes have different widths.

* * * * *